United States Patent
Liss

(10) Patent No.: US 11,215,998 B2
(45) Date of Patent: Jan. 4, 2022

(54) METHOD FOR THE NAVIGATION AND SELF-LOCALIZATION OF AN AUTONOMOUSLY MOVING PROCESSING DEVICE

(71) Applicant: Vorwerk & Co. Interholding GmbH, Wuppertal (DE)

(72) Inventor: Raphael Liss, Bonn (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 246 days.

(21) Appl. No.: 16/470,660

(22) PCT Filed: Dec. 20, 2017

(86) PCT No.: PCT/EP2017/083873
§ 371 (c)(1),
(2) Date: Jun. 18, 2019

(87) PCT Pub. No.: WO2018/115153
PCT Pub. Date: Jun. 28, 2018

(65) Prior Publication Data
US 2019/0324468 A1 Oct. 24, 2019

(30) Foreign Application Priority Data
Dec. 21, 2016 (DE) ..................... 10 2016 125 224.7

(51) Int. Cl.
*G05D 1/02* (2020.01)
*G05D 1/10* (2006.01)

(52) U.S. Cl.
CPC ......... *G05D 1/0219* (2013.01); *G05D 1/0274* (2013.01); *G05D 1/102* (2013.01); *G05D 1/028* (2013.01); *G05D 2201/0203* (2013.01)

(58) Field of Classification Search
CPC .... G05D 1/0219; G05D 1/0274; G05D 1/102; G05D 1/028; G05D 2201/0203
See application file for complete search history.

(56) References Cited

U.S. PATENT DOCUMENTS

| 6,374,155 B1 | 4/2002 | Wallach et al. |
| 9,056,676 B1 * | 6/2015 | Wang ................. G01C 21/3697 |

(Continued)

FOREIGN PATENT DOCUMENTS

| EP | 2 330 471 B1 | 10/2015 |
| WO | 2015/067797 A1 | 5/2015 |
| WO | 2015/142166 A1 | 9/2015 |

OTHER PUBLICATIONS

International Search Report of PCT/EP2017/083873, dated May 4, 2018.

*Primary Examiner* — Nicholas Kiswanto
(74) *Attorney, Agent, or Firm* — Collard & Roe, P.C.

(57) ABSTRACT

A method for the navigation and self-location of an autonomously moving processing device uses an environment map within an environment, wherein environment data of the environment are collected and processed to form an environment map. To support the navigation and self-location of the processing device advantageously, an additional autonomously moving device collects environmental data of the environment for the processing device, and environmental data are transmitted to the processing device. A system consists of an autonomously moving processing device and an additional autonomously moving device.

7 Claims, 3 Drawing Sheets

(56) References Cited

U.S. PATENT DOCUMENTS

| | | | |
|---|---|---|---|
| 9,894,327 B1* | 2/2018 | Jacob | B60F 5/02 |
| 10,656,653 B2* | 5/2020 | Uemura | G05D 1/0088 |
| 10,761,544 B2* | 9/2020 | Anderson | B64C 39/024 |
| 2012/0290152 A1* | 11/2012 | Cheung | G05D 1/0088 |
| | | | 701/2 |
| 2016/0148417 A1 | 5/2016 | Kim et al. | |
| 2018/0074499 A1* | 3/2018 | Cantrell | G05D 1/0088 |

* cited by examiner

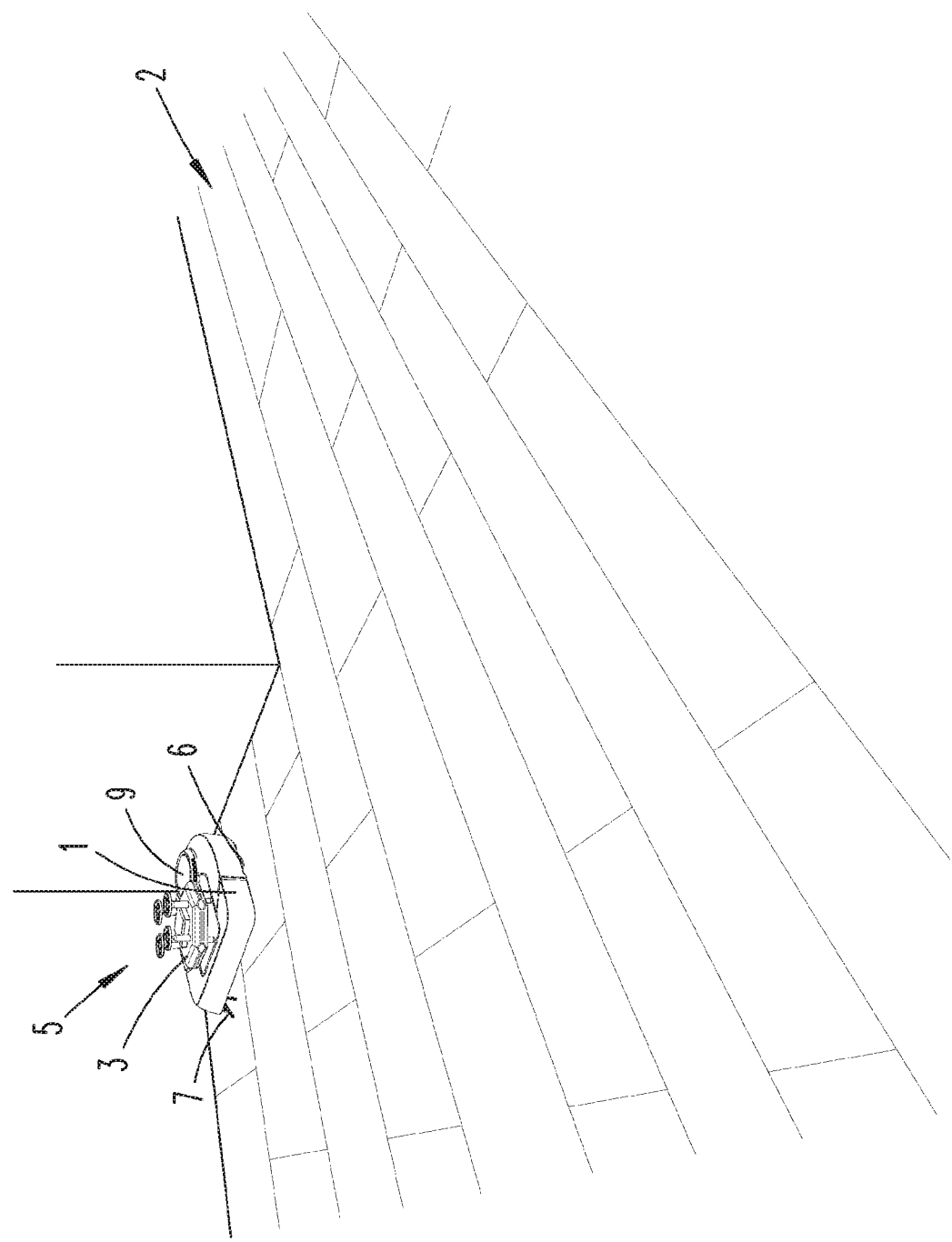

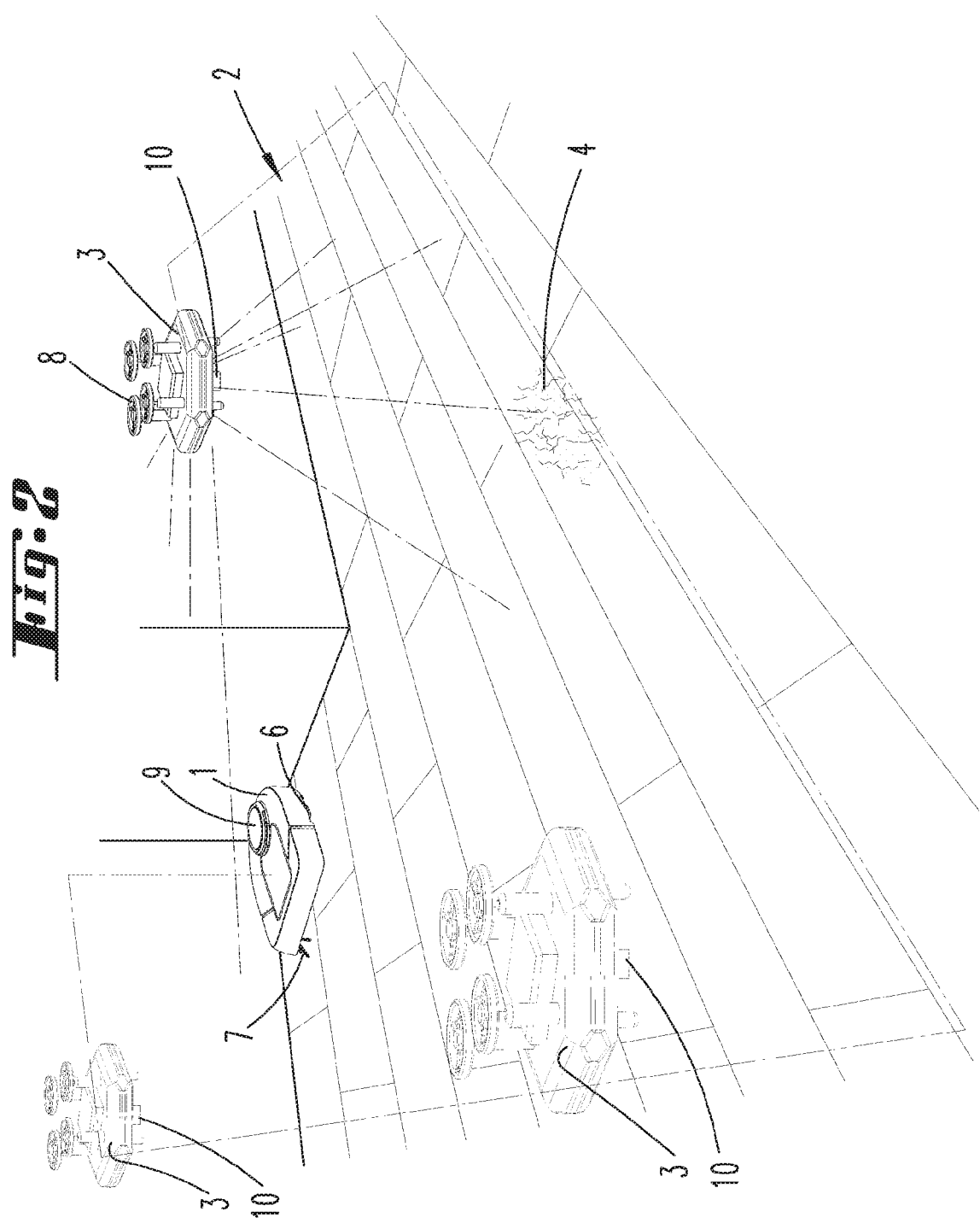

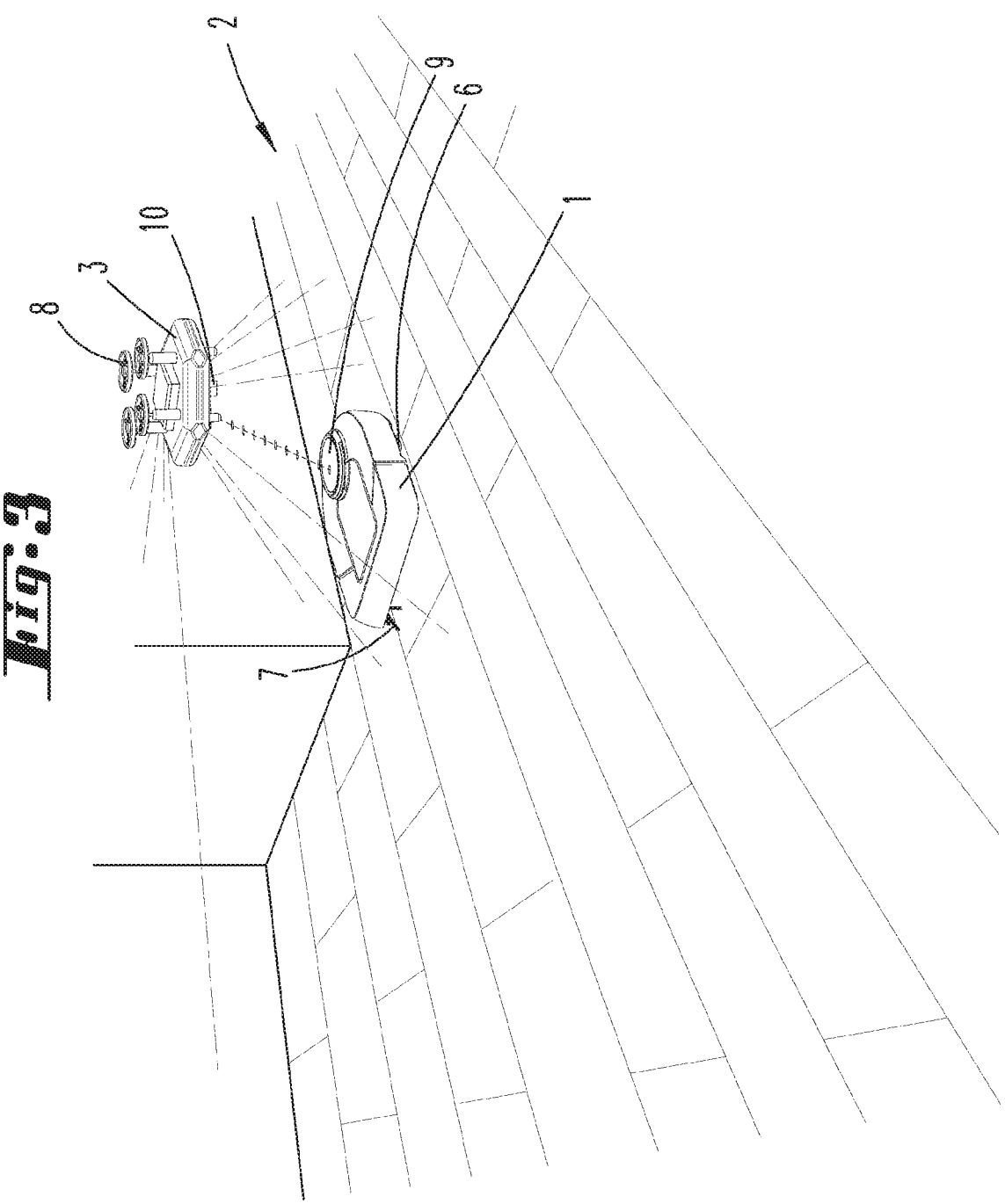

METHOD FOR THE NAVIGATION AND SELF-LOCALIZATION OF AN AUTONOMOUSLY MOVING PROCESSING DEVICE

TECHNICAL FIELD

The invention pertains to a method for the navigation and self-localization of an autonomously moving processing device within an environment based on an environment map, wherein environmental data of the environment is recorded and processed to form an environment map, and wherein an autonomously moving accessory device records the environmental data of the environment for the processing device.

The invention furthermore pertains to a system consisting of an autonomously moving processing device and an autonomously moving accessory device.

PRIOR ART

Methods for the navigation and self-localization of autonomously moving processing devices are known from the prior art.

For example, patent EP 2 330 471 B1 discloses a method for controlling a robot, preferably a self-traveling sweeping and/or vacuuming robot, wherein a map of the environment or a predefined moving path is respectively generated and stored in the robot. The robot has an internal memory, in which a map of one or more rooms can be stored, wherein purposeful floor cleaning can be achieved in the respective room based on said map. The room boundaries and, if applicable, potential obstacles in the room are stored in the map such that an advantageous moving strategy of the robot, e.g. for cleaning the floor in the room, can be realized based on the available map. The environment map can be generated by means of a corresponding measuring apparatus of the robot, which acquires environmental data of the premises, and by means of subsequent data processing.

It is furthermore known to assign an external device, e.g. in the form of a remote control, to the robot in order to control the robot, wherein said external device is suitable for operating the robot by means of corresponding commands. The environment map generated by the robot is transmitted to the external device and the position of the robot within the environment map is displayed. In addition, it is also known to generate and/or supplement an environment map with the external device and to subsequently transmit the environment map to the robot.

For example, document WO 2015/142166 A1 discloses the cooperation between an autonomously moving agricultural vehicle and an aerial vehicle, which generates an environment map and transmits this environment map to the agricultural vehicle. Publication WO 2015/067797 A1 discloses the detection of parameters of the environment of an agricultural vehicle and the transmission of these parameters to the agricultural vehicle by means of an unmanned aerial vehicle (UAV). U.S. Pat. No. 6,374,155 B1 discloses an autonomous mobile robot system with a navigation robot and a functional robot. The navigation robot is designed for generating an environment map and for localizing itself and the functional robot or functional robots within the environment map, as well as for planning a route for these functional robots.

SUMMARY OF THE INVENTION

Based on the above-described prior art, the invention therefore aims to enhance a method for the navigation and self-localization of an autonomously moving processing device.

In order to attain the above-defined objective, the invention initially proposes a method, in which the accessory device transmits the environmental data to an external server and the environmental data is processed to form the environment map on the external server or in which the accessory device processes the environmental data to form the environment map and transmits the environment map to an external server, wherein the environment map is transmitted from the external server (11) to the processing device (1), and wherein the processing device (1) itself also records environmental data of the environment (2) and combines the environmental data or an environment map generated therefrom with the environment map generated from the environmental data recorded by the accessory device (3).

According to an embodiment of the invention, the accessory device transmits the environmental data to an external server, wherein the environmental data is processed to form the environment map on the external server. According to this embodiment, the environmental data recorded by the accessory device is not—or at least not exclusively—processed within the accessory device itself, but rather on an external server, which can be accessed by the accessory device and by the processing device. The accessory device itself therefore does not have to comprise data processing equipment or a memory for the environmental data. In fact, the accessory device may merely comprise the measuring apparatus and a communications module, by means of which the accessory device can communicate with the external server. In this case, the processing of the environmental data and the generation of the environment map take place on the external server. The processing device may also manage without data processing equipment, wherein the resources of the external server with respect to the computing power and the storage capacity are advantageously less restricted than the resources of the processing device and the accessory device. The accessory device and/or the processing device communicate with the external server and with one another, e.g., within a common local network, particularly a WLAN network, or via the Internet, mobile radio communications or the like. It would alternatively also be possible that the accessory device processes the environmental data to form an environment map and transmits the environment map to an external server. In this variation of the method, the environmental data is processed to form an environment map by the accessory device itself, wherein the generated environment map is then transmitted to an external server. For example, the environment map may also be initially transmitted to the external server and then from the external server to the processing device, if applicable in combination with other environmental data, particularly environmental data of additional processing devices and/or accessory devices. In this case, the accessory device is provided with data processing equipment and corresponding algorithms, by means of which the environmental data can be combined to form the environment map. In this context, it would also be possible that the environmental data is initially combined to form a rough environment map within the accessory device, wherein this rough environment map is then transmitted to the processing device and/or the external server in order to be ultimately subjected to further processing, if applicable with the addition of other environmental data, in the processing device and/or on the external server. Furthermore, the processing device itself also records environmental data of the environment and combines the environmental data or an environment map generated therefrom with the environmental map generated from the environmental data recorded by the accessory device. Consequently, not only the accessory device records environmental data of the environment, but also the processing device itself. In this case, the environmental data of the processing device can either be processed to form a separate environment map or respectively combined with environmental data or an environment map of the accessory device. This advantageously results in the combination of highly diverse environmental data or environment maps, which were recorded from different perspectives and/or within different detection planes. Obstacles particularly can be recorded from different perspectives such that they can be comprehensively detected with respect to their dimensions and displayed within the environment map in a particularly realistic manner. In this case, it would also be possible that the processing device initially generates an environment map from the environmental data of the accessory device as a basis for further processing or uses an environment map, which was already generated by the accessory device, as basis and integrates environmental data recorded by the processing device itself into this environment map. Alternatively, the own environmental data of the processing device may initially also be processed to form an environment map and the additional environmental data of the accessory device or an environment map generated therefrom may subsequently be integrated.

The accessory device moves autonomously within the environment and in the process records environmental data, which serves as the basis for generating an environment map. It is not necessary that a user manually carries the accessory device around within the environment and in the process performs a measurement of environmental data. The process of recording environmental data therefore can follow a predefined pattern, e.g. along a predefined traveling route of the accessory device. The method is therefore carried out in cooperation between two autonomously moving devices, namely the processing device on the one hand and the accessory device on the other hand, wherein these devices advantageously have different perspectives on the environment and therefore can record different environmental data, which may optionally also be combined with one another in order to enhance the accuracy of the environment map and to optimize the navigation and self-localization of the processing device. To this end, the accessory device comprises a measuring apparatus, preferably a distance measuring apparatus or a camera, by means of which the environmental data can be recorded. The method for the navigation of the processing device basically also works if only the accessory device comprises a measuring apparatus and only the accessory device records environmental data for generating an environment map. It is not required that the processing device itself is equipped with a measuring apparatus and records environmental data of the environment on its part. However, it is advisable that the accessory device and the processing device record corresponding environmental data, which can be combined with one another, such that all advantages of the invention can be utilized, particularly the recording of environmental data from different perspectives within the environment by means of different types of measuring apparatuses of the processing device and the accessory device.

The environmental data may be advantageously recorded by means of a measuring apparatus of the accessory device, e.g. an optical triangulation measuring apparatus. The measuring apparatus comprises a light source and a photoreceiver. The measuring apparatus measures the distances from obstacles, which serve as the basis for generating the environment map, during a movement of the accessory device within the environment. The processing device can carry out maneuvers and evasive movements depending on a measured distance from an obstacle in order to prevent a collision with an obstacle. The measuring apparatus of the accessory device respectively measures the obstacles in a plane or from a perspective, which is essentially defined by the beam path from the light source to the photoreceiver. This detection plane or perspective advantageously differs from a detection plane or perspective of a measuring apparatus of the processing device. Since the accessory device moves autonomously within the environment, the movement directly leads to different perspectives during the measurement as long as the environmental data is recorded by a measuring apparatus of the accessory device, as well as a measuring apparatus of the processing device. For example, a detection plane of the accessory device may lie above a detection plane of the processing device or the detection plane of the processing device may essentially be arranged horizontally whereas the measuring apparatus of the accessory device views the environment and therefore optionally the processing device located within the environment from above. In this case, the environment map is advantageously generated based on the environmental data acquired by both measuring apparatuses. Due to the combination of the environmental data of the accessory device and the environmental data of the processing device, the environment map can be generated from a greater plurality of environmental data and also from different types of environmental data. The obstacle can thereby be detected and displayed in the environment map in a way that is adapted to the optical perception of a user of the processing device as realistically as possible. For example, the measuring apparatus of the processing device may carry out its measurement in a detection plane near the floor, within which, e.g., only the legs of a chair can be measured, whereas the measuring apparatus of the accessory device detects the obstacle, namely the chair, as a whole in a view from above such that a combination of the environmental data altogether leads to a realistic display of the obstacle in the environment map. A particularly advantageous perspective for the measuring apparatus of the accessory device is a view of the obstacles from above because this perspective makes it possible to detect closed surface areas, which the measuring apparatus of the processing device cannot perceive in a horizontal detection plane. The height of an obstacle particularly can also be determined from the perspective of the measuring apparatus of the accessory device and provides information on whether or not the processing device can pass underneath this obstacle.

The autonomously moving processing device may be realized, for example, in the form of a vacuuming robot, a wiping robot, a mowing robot, a polishing robot or the like. Processing devices with combined functions, e.g. a combined vacuuming/wiping robot, would also be conceivable. The accessory device, which can likewise move autonomously within the environment, may also be realized in the form of such a processing device or an accessory device that only serves for recording the environmental data and moves within the environment for this purpose, but does not perform any other processing functions such as a vacuuming and/or a wiping function. The processing device and the accessory device may basically also be realized in the form of identically constructed devices, wherein the device representing the accessory device in this case respectively records environmental data for the device representing the processing device. The devices may basically also interact with one another in such a way that both devices function as a processing device and as an accessory device, wherein these devices record and respectively transmit environmental data to the other device in such a way that each device has access to all recorded environmental data. In this way, the environmental data of multiple devices can be extensively made available among one another.

The measuring apparatus of the accessory device and/or the processing device may be realized in different ways. For example, the measuring apparatus may comprise a distance measuring apparatus that operates based on optical and/or ultrasonic signals, a camera that records an image of the environment, a contact sensor, an odometric measuring apparatus and/or the like. If the accessory device comprises a camera or a camera chip, the environmental data can be directly acquired in the form of image data, particularly also in the form of RGB data containing color information, which can be very advantageously integrated into the environment map. In this way, obstacle data of the measuring apparatus can also be combined with other environmental data, for example, in order to display the size and/or color of the processing device and/or the obstacles in the environment map. For example, the displayed size may furthermore also be compared with the known dimensions of the processing device in order to better estimate the size, particularly the height, of obstacles based on this comparison.

It is advisable that the accessory device and the processing device have a common reference point within the environment such that environmental data of the processing device and the accessory device can optionally be combined with one another and the position and orientation of the processing device, as well as the accessory device, within the environment is always known. It is advisable that the measuring apparatus of the accessory device utilizes a point of origin within the environment, which corresponds to a point of the processing device. A local relation between the processing device and the accessory device is therefore always known such that the environmental data recorded by the accessory device can be used for the processing device. When the accessory device is not in use, for example, it may be positioned on a housing of the processing device or otherwise stationarily connected thereto. Alternatively, it would also be possible that the processing device and the accessory device are provided with a base station within the environment, which can be jointly utilized, e.g. for charging an accumulator of the processing device or the accessory device. This base station may specify a defined point of origin within the environment, to which the local coordinates of the environmental data of the processing device and/or the accessory device refer.

The accessory device advantageously moves autonomously within the environment, but it would also be possible that the accessory device is controlled by means of an additional device, particularly a remote control. In this case, the remote control may be a smartphone, another mobile communications device or even a stationary computer. In this way, an additional control function is provided for a user of the accessory device. In addition to a manual input of a control command for the accessory device, it would in this case also be possible to realize the control of the accessory device by means of gestures, eye movements or the like.

It is proposed that the accessory device moves within the environment and records environmental data prior to a movement of the processing device. In this embodiment, the accessory device initially moves through the environment and records environmental data for the processing device, from which the environment map can subsequently be generated. The processing device does not start a corresponding movement and navigation within the environment until the environmental data or the environment map generated therefrom has been transmitted from the accessory device to the processing device with interposition of an external server. This embodiment is particularly suitable, for example, if a movement of the processing device should not lead to a load on the accumulator of the processing device or if the processing device currently still carries out other work activities, is serviced at a base station or the like.

It is furthermore proposed that the accessory device follows the processing device during a movement and, in particular, moves at a constant distance from the processing device. In this embodiment, the accessory device essentially follows a route of processing device, e.g. at a higher level. In this case, the distance between the processing device and the accessory device may always be constant such that the local relation between the processing device and the accessory device is always known in a particularly simple manner. It is also possible that the accessory device follows the processing device to a certain destination such as a base station, at which an accumulator of the processing device, as well as an accumulator of the accessory device, can be charged. It would likewise be possible that the processing device follows the accessory device. This is particularly advantageous if the processing device is a service robot, which is guided to a destination by the accessory device or to which different traveling routes are suggested by the accessory device.

It would particularly be possible that the accessory device moves within the environment in a driving or flying manner. The accessory device therefore may particularly drive on a floor of the environment or fly within the environment, e.g. in order to record environmental data from above. The flying accessory device knows an initial distance from a defined location, e.g. due to a point of origin defined on a base station or the processing device, and continuously measures its height during the flight based thereon. Due to this height measurement, the distance from the floor surface can be maintained constant, preferably in the vicinity of the floor, such that obstacles for the processing device can be optimally detected, particularly on a camera image recorded by the accessory device. During its flight, the accessory device can detect persons and animals as moving objects and thereupon assume, e.g., a different height in order to prevent a collision. In this case, the accessory device preferably has a camera system, the detection area of which is directed at a floor surface. The camera system may be a 2D or a 3D camera system that optionally is combined with a wide-angle lens. In addition, the accessory device may also comprise a height measurement sensor and/or a measuring apparatus, the detection area of which is oriented in the direction of flight such that obstacles within the traveling route, i.e. the flight path, of the accessory device can also be detected at an early stage.

It is furthermore proposed that the accessory device compares environmental data with an associated reference value, wherein environmental data that deviates from the reference value, particularly environmental data on a dirt accumulation and/or an object movement, and location information on the location of the deviating environmental data are transmitted to the processing device. According to this embodiment, the accessory device can detect, e.g., special and/or heavy dirt accumulations within the environment by means of its measuring apparatus and transmit this information to the processing device. The processing device can subsequently navigate to the location with the dirt accumulation, e.g., in order to carry out a corresponding cleaning process. The reference value, with which the monitored environmental data such as dirt accumulations are compared, may be a degree of dirt accumulation that is respectively defined, in particular, for different floor coverings. In addition, other states of a surface or environment to be treated or cleaned can also be monitored, e.g. a degree of moisture or a state of movement of an object. If the accessory device detects that a deviation from a reference value or a certain reference bandwidth exists, the conspicuous environmental data is transmitted to the processing device together with location information on the corresponding location, if applicable with interposition of an external server. This information can be used, e.g., for carrying out purposeful spot cleaning at this location by means of the processing device. If the deviating environmental data concerns a detected object movement, it may be provided with special information on the direction and optionally the speed, in/with the object moves, such that this information can be taken into account in routing plans. The accessory device advantageously can move through the environment in predefined time intervals and in the process record environmental data, wherein the processing device only comes into operation and moves within the environment if a special situation, which deviates from a defined reference value or reference range, was previously detected by the accessory device. The accessory device then transmits the corresponding location to the processing device such that the processing device can purposefully navigate to this location. Consequently, the accessory device specifies when the processing device has to start a processing activity. In this context or separately thereof, it would also be possible that the accessory device performs other activities such as monitoring the premises if the accessory device currently does not have to perform any supplementary activity for the processing device. If an exceptional situation such as glass breakage, an opened door or the like is in this case detected within the premises, for example, the accessory device may call the processing device for assistance such that the processing device carries out additional measurements, e.g. with the aid of its measuring apparatus, in order to assess the situation, performs a cleaning task at the corresponding location or the like.

In addition to the above-described method, the invention also proposes a system consisting of an autonomously moving processing device and an autonomously moving accessory device, wherein the processing device and the accessory device are configured and designed for carrying out a method with one or more of the above-proposed characteristic features.

The processing device may be realized, for example, in the form of a cleaning robot, a service robot, a vacuuming robot, a wiping robot, a mowing robot or the like. The accessory device may likewise be realized in the form of such a robot or in the form of a robot that is only responsible for acquiring environmental data and optionally for generating an environment map from this environmental data. The processing device is preferably designed for moving in a driving manner on a surface to be treated. For example, the accessory device may also move in a driving manner on the surface and/or in a flying manner within the environment, e.g. in the form of an aerial drone. The accessory device is provided with a measuring apparatus for acquiring environmental data, wherein said measuring apparatus comprises, e.g., a distance measuring apparatus, a camera, a contact sensor, an odometric measuring apparatus and/or the like. The processing device may likewise be provided with such a measuring apparatus. The system includes—as already described above with reference to the method—an external server that is communicatively linked to the accessory device, as well as to the processing device. The accessory device and the processing device respectively comprise a communications module for realizing the data transmission. This also applies to the external server included in the system. The accessory device and the processing device may be equipped with data processing equipment for processing the environmental data to form an environment map and/or an optional data memory for storing the environmental data and/or a generated environment map. In the context of the invention, the accessory device and the processing device are realized in such a corresponding manner that environmental data recorded by the accessory device and/or an environment map generated therefrom can be received by the processing device and/or serve as a basis for control commands concerning a movement and/or processing activity of the processing device within the environment.

BRIEF DESCRIPTION OF THE DRAWINGS

The invention is described in greater detail below with reference to exemplary embodiments. In the drawings:

FIG. 1 shows an environment with a system consisting of a processing device and an accessory device, FIG. 2 shows a movement of the accessory device relative to the processing device, and FIG. 3 shows the processing device and the accessory device during a coupled movement.

DESCRIPTION OF THE EMBODIMENTS

FIG. 1 shows a system 5 consisting of a processing device 1 and an accessory device 3. In this case, the processing device 1 is realized in the form of a vacuuming robot and can move autonomously within an environment 2. The processing device 1 comprises a housing, wherein wheels 6 that are driven by an electric motor and a brush 7, which protrudes beyond the lower edge of a housing bottom and is also driven by an electric motor, are arranged on the underside of said housing that faces a surface of the environment 2 to be cleaned. In the region of the brush 7, the processing device 1 has a not-shown suction mouth opening, through which air containing material to be vacuumed up can be drawn into the processing device 1 by means of a motor-blower unit. The processing device 1 comprises a not-shown rechargeable accumulator for the power supply for the individual electrical components of the processing device 1 such as the drives for the wheels. 6 and the brush 7, as well as for additionally provided electronics.

The processing device 1 is furthermore equipped with a measuring apparatus 9 that is arranged within the housing of the processing device 1. In this example, the measuring apparatus 9 is realized in the form of a triangulation measuring apparatus that can measure distances from obstacles within the environment 2 of the processing device 1. The measuring apparatus 9 specifically comprises a laser diode, the emitted light beam of which is deflected out of the housing of the processing device 1 by means of a deflection apparatus and rotatable, particularly by a measuring angle of 360 degrees, about an axis of rotation that extends vertically in the illustrated orientation of the processing device 1. An all-around distance measurement can thereby be realized.

The measuring apparatus 9 can measure the environment 2 of the processing device 1 in a preferably horizontal plane, i.e. in a plane that essentially extends parallel to the surface to be cleaned. In this way, the processing device 1 can be moved in the environment 2 such that a collision with obstacles is prevented. The environmental data recorded by means of the measuring apparatus 9, which represents distances from obstacles and/or walls in the environment 2, is used for generating an environment map of the environment 2.

The accessory device 3, which in this case is realized in the form of an aerial drone, is positioned on the housing of the processing device 1. The processing device 1 and the accessory device 3 jointly form a system 5 as defined by the invention. The accessory device 3 comprises a plurality of propellers, 8, by means of which the accessory device 3 can lift off the processing device 1 and fly around within the environment 2. The accessory device 3 is furthermore equipped with a measuring apparatus 10. In this example, the measuring apparatus 10 initially comprises a camera, the detection area of which is directed at the floor of the environment 2. The measuring apparatus 10 additionally comprises a height measurement sensor and a distance measuring apparatus, the detection area of which is essentially aligned in a horizontal plane in order to detect obstacles in the traveling route of the accessory device 3 at an early stage.

The processing device 1 and the accessory device 3 are furthermore equipped with not-shown communications modules for communicating with one another and with an external server 11. In addition, the accessory device 3 and the processing device 1 are respectively provided with data processing equipment and a data memory.

Multiple data processing steps basically are required for the navigation of the processing device 1 within the environment 2 and therefore also for avoiding obstacles. An environment map initially has to be generated from the environmental data of at least one measurement apparatus 9, 10, wherein this may take place within the data processing equipment of the processing device 1 or within the data processing equipment of the accessory device 3. An advantageous behavior pattern of the processing device 1, which serves as the basis for a control command, is then calculated based on the environment map and a known current position of the processing device 1 in this environment map. For example, the wheels 6 or the brush 7 of the processing device 1 are then activated by the control command.

Due to the initial position on the processing device 1 illustrated in FIG. 1, the accessory device 3 knows an initial distance from the surface of the environment 2 to be cleaned. A movement of the accessory device 3 from this initial position may then take place, wherein the reference point preferably is the stationary processing device 1 in this case. The accessory device 3 could alternatively also start from a stationary base station.

FIG. 2 shows a situation, in which the processing device 1 still remains stationary on the floor surface of the environment 2. The accessory device 3, which initially was positioned on the processing device 1, is on a reconnaissance flight and in the process records environmental data such as, among other things, a dirt accumulation 4 on the floor surface of the environment 2 by means of the measuring apparatus 10.

According to the embodiment shown, the invention is implemented, e.g., in that the accessory device 3 flies around autonomously within the environment 2. In this case, the accessory device may either follow a predefined flight path, fly around within the environment 2 in accordance with a random principle and with the assistance of the distance sensors or also be controlled, e.g., by a user with the aid of a remote control, particularly a mobile telephone. Due to its initial position on the housing of the processing device 1, the accessory device 3 knows an initial distance from the floor of the surroundings. 2 and during the flight determines its height from the floor surface continuously or in regular or irregular intervals. In this case, the height from the floor surface can be determined, for example, by means of a distance measurement of the measuring apparatus 10. For example, the distance of the accessory device 3 from the floor surface essentially is maintained constant during the flight of the accessory device 3, in this example at about 1 m, such that obstacles or special environmental data of the floor surface, e.g. dirt accumulations 4, can be optimally detected in the images recorded by the measuring apparatus 10. During its flight, the accessory device 3 furthermore detects moving objects such as persons, animals or other autonomously moving processing devices 1 or accessory devices 3. In order to prevent a collision with these moving objects, a control unit of the accessory device 3 controls the accessory device 3 in such a way that it flies around the obstacles, e.g. by lowering the flight level of the accessory device 3 to a lower level or by banking.

The accessory device 3 flies around the environment 2 and generates an environment map with obstacles, walls and the like from the environmental data recorded by means of the measuring apparatus 10 while the processing device 1 still remains unchanged in the same position of the environment 2. The environmental data makes it possible, e.g., to classify objects such as tables, chairs, cabinets, etc. In this case, distances from objects are likewise estimated by means of the measuring apparatus 10. While the environmental data is recorded, the measuring apparatus 10 of the accessory device 3 not only registers obstacles, but also dirt accumulations 4 on the floor surface, which excessively deviate from a defined reference value and therefore are classified as particularly severe dirt accumulations 4 that require subsequent cleaning, particularly spot cleaning, by means of the processing device 1. The dirt accumulations 4 are registered in the environment map and provided with corresponding location information.

The data processing equipment of the accessory device 3 transmits the environment map to the processing device 1 with interposition of the server (1) after the flight of the accessory device 3 or alternatively already during its flight. To this end, the accessory device 3 and the processing device 1 communicate via wireless data transmission, particularly with the aid of their communications modules. The processing device 1 subsequently has the environment map of the environment 2 at its disposal and can drive around autonomously within the environment 2, particularly navigate to the dirt accumulation 4 and carry out a cleaning process. To this end, the processing device 1 exclusively resorts to the environment map generated by means of the accessory device 3.

It would alternatively also be possible that the processing device 1 receives the environment map generated by the accessory device 3 as such, wherein the processing device may optionally combine this environment map with environmental data of its own measuring apparatus 9 and processes the combined environmental data to form an environment map. The external server 11 could likewise be used for generating the environment map. The processing device 1 or the external server 11 can then respectively decide if the environmental data of the accessory device 3 contains additional helpful information, e.g. by means of corresponding data processing equipment. If this is the case, the environmental data of the accessory device 3 can be combined with the environmental data of the processing device 1.

While the processing device 1 on its part moves autonomously within the environment 2, the accessory device 3 can furthermore be used for performing an auxiliary activity for the processing device 1, e.g., if the processing device 1 gets into a situation, from which it cannot break free on its own, or detects a situation, in which the measuring apparatus 10 of the accessory device 3 is required, for example, for obtaining a view of the processing device 1 and the floor surface of the environment 2 from above. This may also be helpful if portable obstacles are located within the environment 2 and their current location remains concealed from the processing device 1. In these situations, the environmental data of the measuring apparatus 10 of the accessory device 3 can be evaluated in order to assist the processing device 1. This is also helpful, for example, if the processing device 1 no longer knows its current position and orientation within the environment 2 because a user has manually lifted the processing device 1 off the floor surface and displaced the processing device in the environment 2. The accessory device 3 can also point the way for the processing device 1 in that the processing device 1 follows the moving accessory device 3. Furthermore, the accessory device 3 may suggest to the processing device 1 multiple possible route variations for reaching a certain destination, for driving to an initial position, for breaking free from a stuck situation and the like.

FIG. 3 shows another embodiment of the invention, in which the accessory device 3 follows the processing device 1 during a movement. In this case, the accessory device 3 serves as a satellite of the processing device 1 and preferably follows the processing device at a constant distance. Consequently, environmental data of the environment 2 can be simultaneously recorded by means of the processing device 1 on the one hand and by means of the accessory device 3 on the other hand such that obstacles within the environment 2 can be detected from different perspectives and distances. In this embodiment, the data processing of the environmental data may also take place either in the accessory device 3, in the processing device 1 or on the external server 11.

LIST OF REFERENCE SYMBOLS

1 Processing device
2 Environment
3 Accessory device
4 Dirt accumulation
5 System
6 Wheel
7 Brush
8 Propeller
9 Measuring apparatus
10 Measuring apparatus
11 External server

The invention claimed is:

1. A method for the navigation and self-localization of an autonomously moving household processing device (1) within an environment (2) based on an environment map, wherein environmental data of the environment (2) is recorded and processed to form a first environment map, and wherein an autonomously moving accessory device (3) records the environmental data of the environment (2) for the processing device (1), wherein the accessory device (3) transmits the environmental data to an external server (11) and the environmental data is processed to form the first environment map on the external server (11) or wherein the accessory device (3) processes the environmental data to form the first environment map and transmits the first environment map to the external server (11), wherein the first environment map, which has been processed within the external server or which has been processed by the accessory device (3), is transmitted from the external server (11) to the processing device (1), and wherein the processing device (1) itself also records environmental data of the environment (2) and combines the environmental data or a second environment map generated therefrom with the first environment map generated from the environmental data recorded by the accessory device (3), and wherein the processing device (1) integrates environmental data recorded by the processing device (1) itself into the already generated first environment map or processes environmental data recorded by the processing device (1) itself initially to form the second environment map and then integrates the first environment map subsequently, wherein the accessory device (3) follows the processing device (1) during a movement, wherein the accessory device (3) follows a route of the processing device, and wherein the accessory device (3) and the processing device record corresponding environmental data, which are combined with one another, from different perspectives.

2. The method according to claim 1, wherein the accessory device (3) moves within the environment (2) and records environmental data prior to a movement of the processing device (1).

3. The method according to claim 1, wherein the accessory device (3) moves at a constant distance from the processing device.

4. The method according to claim 1, wherein the accessory device (3) moves within the environment in a driving or flying manner.

5. The method according to claim 1, wherein the accessory device (3) compares environmental data with an associated reference value, wherein environmental data that deviates from the reference value, and wherein location information on the location of the deviating environmental data are transmitted to the processing device (1).

6. The method according to claim 5, wherein the processing device (1) navigates to the location after the reception of the environmental data and the location information and carries out a processing activity and/or a measuring activity at this location.

7. A system (5) comprising an autonomously moving processing device (1) and an autonomously moving accessory device (2), wherein the processing device (1) and the accessory device (2) are configured and designed for carrying out a method according to claim 1.

* * * * *